United States Patent
Shimazu et al.

[11] Patent Number: 5,949,913
[45] Date of Patent: Sep. 7, 1999

[54] METHOD AND APPARATUS FOR MODIFYING MULTI-TONE IMAGE

[75] Inventors: Shigeaki Shimazu; Souichi Kimura, both of Kyoto, Japan

[73] Assignee: Dainippon Screen Mfg. Co., Ltd., Kyoto, Japan

[21] Appl. No.: 08/671,290

[22] Filed: Jun. 27, 1996

[30] Foreign Application Priority Data

Jul. 7, 1995 [JP] Japan .................................. 7-195948

[51] Int. Cl.⁶ .............................. G06K 9/40; G06K 9/54; G06K 9/60; G06K 9/48
[52] U.S. Cl. ........................ 382/254; 382/266; 382/302; 382/199
[58] Field of Search .................................. 382/266, 254, 382/268–270, 302, 199; 358/455, 448

[56] References Cited

U.S. PATENT DOCUMENTS 5,097,521  3/1992  Massmann .............................. 382/266

FOREIGN PATENT DOCUMENTS 0614154  9/1994  European Pat. Off. ........ G06F 15/68
6-261209  9/1994  Japan .

OTHER PUBLICATIONS

Shih et al., "Threshold Decomposition of Gray–Scale Morphology into Binary Morphology", IEEE Transactions on Pattern Analysis and Machine Intelligence, vol. 11, No. 1, Jan. 1989, pp. 31–42.

John C. Russ, The Image Processing Handbook, 2nd Ed., CRC Press Inc., 1995, pp. 407–414.

Primary Examiner—Leo H. Boudreau
Assistant Examiner—Dmitry A. Novik
Attorney, Agent, or Firm—McDermott, Will & Emery

[57] ABSTRACT

A mask area is specified as a target area of modification in a multi-tone image. The multi-tone image is converted to a plurality of binary images with a plurality of threshold values. A plurality of density-contours corresponding to the plurality of binary images are extracted. Without implementing any contraction or expansion, a portion overlapping the contour of the mask area is deleted from each extracted density-contour. A plurality of modified density-contours which do not include the portions overlapping the contour of the mask area are converted back to a modified multi-tone image.

22 Claims, 25 Drawing Sheets

↓

↑ IMAGE RESTORATION

↓ BINARIZATION & CONTOUR EXTRACTION

Fig. 3(F) MODIFIED BINARY IMAGES

↓ INTERSECTION DETECTION (DELETE OVERLAPPED PORTION FROM DENSITY-CONTOURS)

Fig. 3(D)    Fig. 3(E) MODIFIED DENSITY-CONTOURS

CONNECT EACH INTERSECTION PAIR →

Dth=4

Dth=3

Dth=2

Dth=1

PIXEL CONTOUR

BOUNDARY CONTOUR

CONTOUR MODIFICATION PROCESS

DENSITY-CONTOUR
OF IMAGE INCLUDING
A DEFECT MASK

CONTOUR REPRESENTING
ORIGINAL DENSITY

DEFECT MASK CONTOUR

DEFECT MASK CONTOUR

DENSITY-CONTOUR

DELETE DEFECT MASK
CONTOUR FROM
DENSITY-CONTOUR

DETECT INTERSECTIONS
OF DENSITY-CONTOUR
AND DEFECT MASK CONTOUR

DETERMINE
INTERSECTION
PAIRS

INTERPOLATE
INTERSECTION
PAIRS WITH LINE
SEGMENTS

DIVIDE AND SORT

VERTICAL LINE SEGMENT VECTORS

HORIZONTAL LINE SEGMENT VECTORS

INTERSECTIONS $$\overline{P2P11}+\overline{P5P8}<\overline{P2P5}+\overline{P8P11}<\overline{P2P8}+\overline{P5P11}$$

(A)　　　(B)　　　(C)

INITIAL STATE

| INTERSECTION PAIR DATA {POUT, PIN} | VECTOR POINT SEQUENCE | DETECTED-VECTOR BUFFER |
|---|---|---|
| {P16, P1 } <br> {P3, P14} <br> {P13, P4 } <br> {P6, P11} <br> {P10, P7 } | {P1, P2, P3, P4, P5, P6, P7, P8, P9, P10, P11, P12, P13, P14, P15, P16} | {NULL} |

STEP S1

| INTERSECTION PAIR DATA {POUT, PIN} | VECTOR POINT SEQUENCE | DETECTED-VECTOR BUFFER |
|---|---|---|
| {P16, P1 }<br>{P3, P14}<br>{P13, P4 }<br>{P6, P11}<br>{P10, P7 } | {P1, P2, P3, P4, P5, P6, P7, P8, P9, P10, P11, P12, P13, P14, P15, P16} | {P1} |

STEPS S2 AND S3

| INTERSECTION PAIR DATA {POUT, PIN} | VECTOR POINT SEQUENCE | DETECTED-VECTOR BUFFER |
|---|---|---|
| {P16, P1 } | {P1, P2, P3, P4, P5, P6, P7, P8, P9, P10, P11, P12, P13, P14, P15, P16} | {P1, P2, P3} |
| {P3 , P14} | | |
| {P13, P4 } | | |
| {P6 , P11} | | |
| {P10, P7 } | | |

STEP S4

| INTERSECTION PAIR DATA {POUT, PIN} | VECTOR POINT SEQUENCE | DETECTED-VECTOR BUFFER |
|---|---|---|
| {P16, P1 } | {P1, P2, P3, P4, P5, P6, P7, P8, P9, P10, P11, P12, P13, P14, P15, P16} | {P1, P2, P3, P14} |
| {P3 , P14} | | |
| {P13, P4 } | | |
| {P6 , P11} | | |
| {P10, P7 } | | |

STEPS S2 AND S3

| INTERSECTION PAIR DATA {POUT, PIN} | VECTOR POINT SEQUENCE | DETECTED-VECTOR BUFFER |
|---|---|---|
| {P16, P1 } | {P1, P2, P3, P4, P5, P6, P7, P8, P9, P10, P11, P12, P13, P14, P15, P16} | {P1, P2, P3, P14, P15, P16} |
| {P3, P14} | | |
| {P13, P4 } | | |
| {P6, P11} | | |
| {P10, P7 } | | |

STEP S4

| INTERSECTION PAIR DATA {POUT, PIN} | VECTOR POINT SEQUENCE | DETECTED-VECTOR BUFFER |
|---|---|---|
| {P16, P1 } | {P1, P2, P3, P4, P5, P6, P7, P8, P9, P10, P11, P12, P13, P14, P15, P16} | {P1, P2, P3, P14, P15, P16} |
| {P3 , P14} | | |
| {P13, P4 } | | |
| {P6 , P11} | | |
| {P10, P7 } | | |

STEP S6

| INTERSECTION PAIR DATA {POUT, PIN} | VECTOR POINT SEQUENCE | DETECTED-VECTOR BUFFER |
|---|---|---|
| {P16, P1}~~ ~~ {P3, P14}~~ ~~ {P13, P4} {P6, P11} {P10, P7} | {~~P1, P2, P3~~, P4, P5, P6, P7, P8, P9, P10, P11, P12, P13, ~~P14, P15, P16~~} | {P1, P2, P3, P14, P15, P16} ↓ OUTPUT TO CONTOUR VECTOR DATA MEMORY |

FORMATION OF CLOSED-CONTOUR VECTORS

| INTERSECTION PAIR DATA {POUT, PIN} | VECTOR POINT SEQUENCE | DETECTED-VECTOR BUFFER |
|---|---|---|
| {P13, P4 }<br>{P6 , P11}<br>{P10, P7 } | {P4, P5, P6, P7, P8, P9, P10,<br>P11, P12, P13} | {P4, P5, P6, P11, P12, P13} |

OUTPUT OF VECTOR DATA

| INTERSECTION PAIR DATA {POUT, PIN} | VECTOR POINT SEQUENCE | DETECTED-VECTOR BUFFER |
|---|---|---|
| {P13, P4} {P6, P11} {P10, P7} | {P4, P5, P6, P7, P8, P9, P10, P11, P12, P13} | {P4, P5, P6, P11, P12, P13} ↓ OUTPUT TO CONTOUR VECTOR DATA MEMORY |

FORMATION OF CLOSED-CONTOUR VECTORS

| INTERSECTION PAIR DATA {POUT, PIN} | VECTOR POINT SEQUENCE | DETECTED-VECTOR BUFFER |
|---|---|---|
| {P10, P7} | {P7, P8, P9, P10} | {P7, P8, P9, P10} |

OUTPUT OF VECTOR DATA

| INTERSECTION PAIR DATA {POUT, PIN} | VECTOR POINT SEQUENCE | DETECTED-VECTOR BUFFER |
|---|---|---|
| {P10, P7} | {P7, P8, P9, P10} | {P7, P8, P9, P10} ↓ OUTPUT TO CONTOUR VECTOR DATA MEMORY |

ORIGINAL IMAGE HAVING DEFECT

BINARY CODING

SPECIFY DEFECT MASK

CONTOURS OF
BINARY IMAGES

CONTOUR OF
DEFECT MASK

DETECT INTERSECTIONS
(DELETE PORTIONS INCLUDED
IN MASK CONTOUR FROM
DENSITY-CONTOURS)

METHOD AND APPARATUS FOR MODIFYING MULTI-TONE IMAGE

BACKGROUND OF THE INVENTION

1. Field of the Invention

The present invention relates to a method of and an apparatus for modifying a multi-tone image.

2. Description of the Related Art

An apparatus for modifying a multi-tone image is, for example, disclosed in a commonly owned U.S. Pat. No. 5,724,454 entitled "METHOD AND APPARATUS FOR CORRECTING MULTI-TONE IMAGE", the disclosure of which is incorporated herein by reference. This apparatus converts a multi-tone image into a plurality of binary images, and contract and expand the plurality of binary images to modify a contour included in the multi-tone image. A defect included in the multi-tone image is eliminated accordingly.

The technique of modifying a contour while repeating the contraction and expansion of images leads to the problem that fine parts of the contour might be mistakenly eliminated.

SUMMARY OF THE INVENTION

Accordingly, an object of the present invention is to modify a contour included in a multi-tone image without carrying out image contraction and image expansion.

Accordingly the present invention is directed to an apparatus for modifying a multi-tone image. The apparatus comprises: mask area setting means for specifying a mask area as a target area of modification in the multi-tone image; binarization means for converting multi-tone image data representing the multi-tone image to a plurality of binary image data with a plurality of threshold values; contour extracting means for generating mask-contour vector data representing a contour of the mask area, and generating a plurality of density-contour vector data representing contours of binary images represented by the plurality of binary image data; intersection extracting means for extracting a plurality of intersections of each density-contour expressed by each of the plurality of density-contour vector data and the mask-contour expressed by the mask-contour vector data; modification means for connecting the plurality of intersections, which are included in the each density-contour expressed, in pairs to make the each density-contour to be a closed figure, and generating a plurality of modified contour vector data, each the modified contour vector data representing the each closed density-contour; and restoration means for converting the plurality of modified contour vector data to modified multi-tone image data.

The closed density-contour modified by the modification means does not comprise any portion either overlapping or included in the mask contour. By conversion of the modified contour vector data to multi-tone image data, a modified multi-tone image having a modified contour is to be restored. Accordingly, the contour included in the multi-tone image can be modified without carrying out image contraction and image expansion.

According to an aspect of the present invention, the intersection extracting means comprises: deletion means for deleting a portion overlapping the mask-contour from the each density-contour.

In a preferred embodiment, the modification means comprises: intersection pair determination means for determining a combination of intersection pairs, which are to be connected with each other, among the plurality of intersections; and intersection pair connecting means for connecting each the intersection pair to make the density-contour to be a closed figure.

The intersection pair determination means comprises: means for determining the combination of intersection pairs so as to prevent a plurality of connecting lines connecting the respective intersection pairs from crossing over one another.

According to another aspect of the present invention, the intersection detecting means comprises: deletion means for deleting a portion included in the mask-contour from the each density-contour.

The present invention is also directed to an apparatus comprising: mask area setting means for specifying a mask area as a target area of modification in the multi-tone image; filling means for filling the mask area in the multi-tone image with a predetermined density; binarization means for converting multi-tone image data representing the multi-tone image including the filled mask area to a plurality of binary image data with a plurality of threshold values; contour extracting means for generating mask-contour vector data representing a contour of the mask area, and converting the plurality of binary image data to a plurality of density-contour vector data, each the density-contour vector data representing a contour of a binary image represented by each the binary image data; intersection extracting means for extracting a plurality of intersections of each density-contour expressed by each of the plurality of density-contour vector data and the mask-contour expressed by the mask-contour vector data and for deleting a portion overlapping the mask-contour from the each density-contour; modification means for connecting the plurality of intersections, which are included in the each density-contour, in pairs to make the each density-contour to be a closed figure, and for generating a plurality of modified contour vector data, each the modified contour vector data representing the each closed density-contour; and restoration means for converting the plurality of modified contour vector data to modified multi-tone image data.

Each density-contour includes a portion overlapping the mask contour. The intersection extracting means deletes a portion overlapping the mask contour from each density-contour, while the modification means connects the plurality of intersections in pairs. This gives modified density-contours which do not comprise any portions of the mask contour. Conversion of the modified contour vector data to multi-tone image data will produce a modified multi-tone image having a modified contour. Thus the apparatus can modify the contour included in a multi-tone image without carrying out image contraction and image expansion.

The present invention is further directed to an apparatus comprising: means for specifying a mask area as a target area of modification in the multi-tone image; means for generating a plurality of binary images by binarization the multi-tone image with a plurality of threshold values; means for extracting a plurality of density-contours corresponding to the plurality of binary images; means for deleting a portion overlapping with a contour of the mask area from each the density-contour without carrying out image contraction and image expansion; and means for converting the plurality of density-contours, from which the contour of the mask area has been deleted, to a modified multi-tone image.

In the preferred embodiment, the means for deleting comprises: means for detecting a plurality of intersections of the each density-contour and the contour of the mask area, and connecting the plurality of intersections in pairs when deleting the portion overlapping with the contour of the mask area from each density-contour.

According to an aspect of the present invention, the apparatus comprises: means for specifying a mask area as a target area of modification in the multi-tone image; means for generating a plurality of binary images by binarization the multi-tone image with a plurality of threshold values; means for extracting a plurality of density-contours corresponding to the plurality of binary images; means for deleting a portion included in a contour of the mask area from each the density-contour without carrying out image contraction and image expansion; and means for converting the plurality of density-contours, from which the contour of the mask area has been deleted, to a modified multi-tone image.

The present invention is also directed to a method of modifying a multi-tone image. The method comprises the steps of: (a) specifying a mask area as a target area of modification in the multi-tone image; (b) converting multi-tone image data representing the multi-tone image to a plurality of binary image data with a plurality of threshold values; (c) generating mask-contour vector data representing a contour of the mask area, and generating a plurality of density-contour vector data representing contours of binary images represented by the plurality of binary image data; (d) extracting a plurality of intersections of each density-contour expressed by each of the plurality of density-contour vector data and the mask-contour expressed by the mask-contour vector data; (e) connecting the plurality of intersections, which are included in the each density-contour expressed, in pairs to make the each density-contour to be a closed figure, and generating a plurality of modified contour vector data, each the modified contour vector data representing the each closed density-contour; and (f) converting the plurality of modified contour vector data to modified multi-tone image data.

According to another aspect of the present invention, the method comprises the steps of: specifying a mask area as a target area of modification in the multi-tone image; filling the mask area in the multi-tone image with a predetermined density; converting multi-tone image data representing the multi-tone image including the filled mask area to a plurality of binary image data with a plurality of threshold values; generating mask-contour vector data representing a contour of the mask area, and converting the plurality of binary image data to a plurality of density-contour vector data, each the density-contour vector data representing a contour of a binary image represented by each the binary image data; extracting a plurality of intersections of each density-contour expressed by each of the plurality of density-contour vector data and the mask-contour expressed by the mask-contour vector data and for deleting a portion overlapping the mask-contour from the each density-contour; connecting the plurality of intersections, which are included in the each density-contour, in pairs to make the each density-contour to be a closed figure, and for generating a plurality of modified contour vector data, each the modified contour vector data representing the each closed density-contour; and converting the plurality of modified contour vector data to modified multi-tone image data.

According to still another aspect of the present invention, the method comprises the steps of: specifying a mask area as a target area of modification in the multi-tone image; generating a plurality of binary images by binarization the multi-tone image with a plurality of threshold values; extracting a plurality of density-contours corresponding to the plurality of binary images; deleting a portion overlapping with a contour of the mask area from each the density-contour without carrying out image contraction and image expansion; and converting the plurality of density-contours, from which the contour of the mask area has been deleted, to a modified multi-tone image.

According to another aspect of the present invention, the method comprises the steps of: specifying a mask area as a target area of modification in the multi-tone image; generating a plurality of binary images by binarization the multi-tone image with a plurality of threshold values; extracting a plurality of density-contours corresponding to the plurality of binary images; deleting a portion included in a contour of the mask area from each the density-contour without carrying out image contraction and image expansion; and converting the plurality of density-contours, from which the contour of the mask area has been deleted, to a modified multi-tone image.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)–3(G) illustrate a concrete procedure of the processing in the first embodiment;

DESCRIPTION OF THE PREFERRED EMBODIMENT

A. Structure of Apparatus

The following describes the best mode for carrying out the present invention in the form of preferred embodiments.

Figure 1:
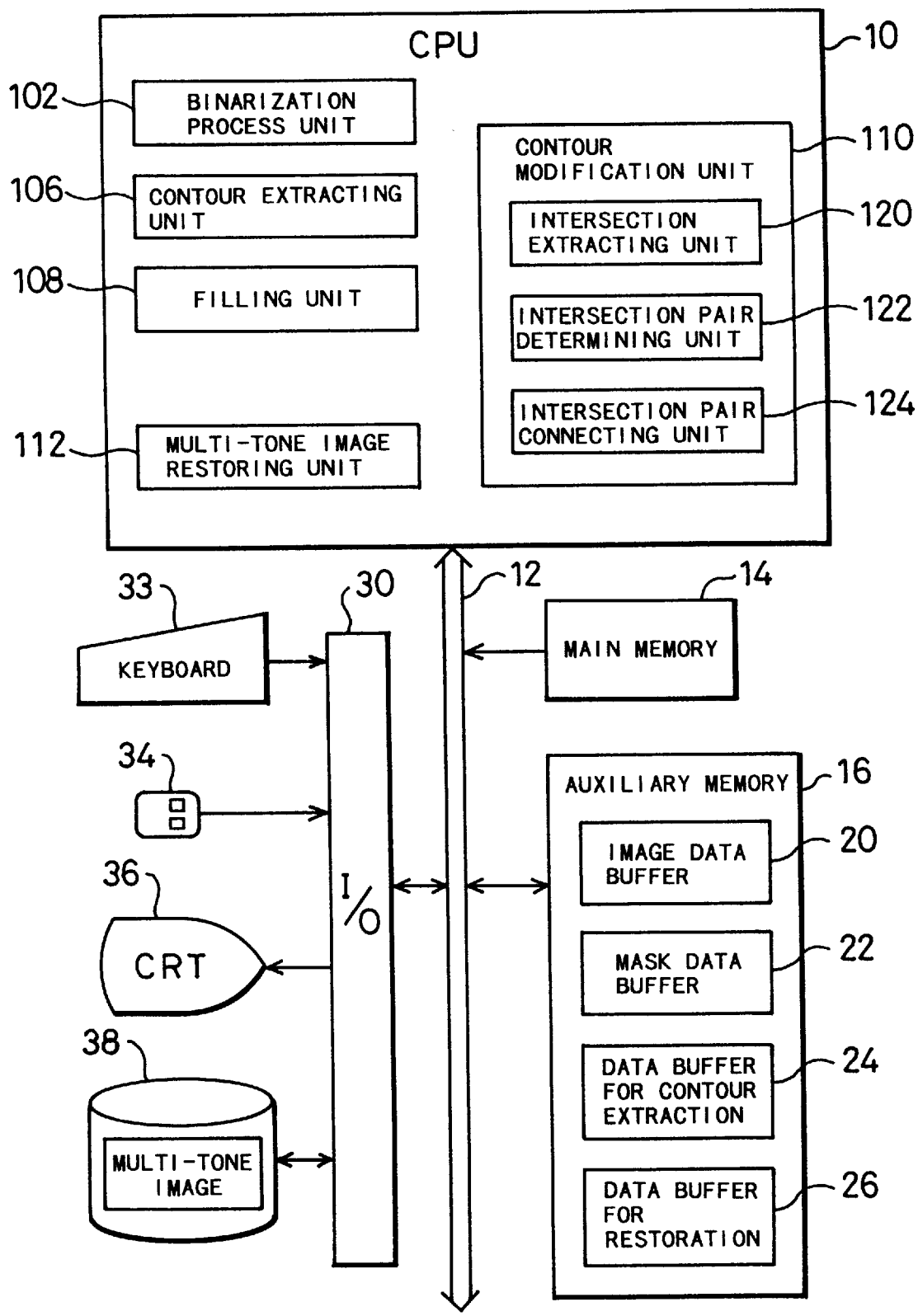
FIG. 1 is a block diagram illustrating an image processing apparatus embodying the present invention.

FIG. 1 is a block diagram illustrating an image processing apparatus embodying the present invention. The image processing apparatus includes a CPU 10 and a bus line 12. The bus line 12 is connected to a main memory 14 and an auxiliary memory 16. The memories are allocated to the address space of the CPU 10. The bus line 12 is also connected to a keyboard 33, a mouse 34, a color CRT 36, and a magnetic disk 38 via an input/output interface 30. Multi-tone image data are stored in the magnetic disk 38.

The CPU 10 executes software programs stored in the main memory 14 to implement the respective functions of: a binarization process unit 102, a contour extracting unit 106, a filling unit 108, a contour modification unit 110, and a multi-tone image restoring unit 112. The contour modification unit 110 have functions of an intersection extracting unit 120, an intersection pair determining unit 122, and an intersection pair connecting unit 124. Details of these functions will be described later. These functions realized by the CPU 10 may be effected by hardware. The software programs for implementing such functions may be stored in a portable storage media, such as floppy disks and CD-ROMs. In this case, the required software is read out of the portable storage media to be stored in the main memory 14.

The auxiliary memory 16 has a variety of buffer areas including: an image data buffer 20, a mask data buffer 22, a third data buffer 24 for contour extraction, and a fourth data buffer 26 for image restoration. The image data buffer 20 stores multi-tone image data and binary image data. The mask data buffer 22 stores mask data representing a mask area set in a multi-tone image. The contour-extracting data buffer 24 stores the data used by the contour extracting unit 106 in the process of generating contour vector data from binary image data. The restoration data buffer 26 stores the data used by the multi-tone image restoring unit 112 in the process of restoring multi-tone image data from modified contour vector data.

B. Contour Modification Process in First Embodiment

Figure 2:
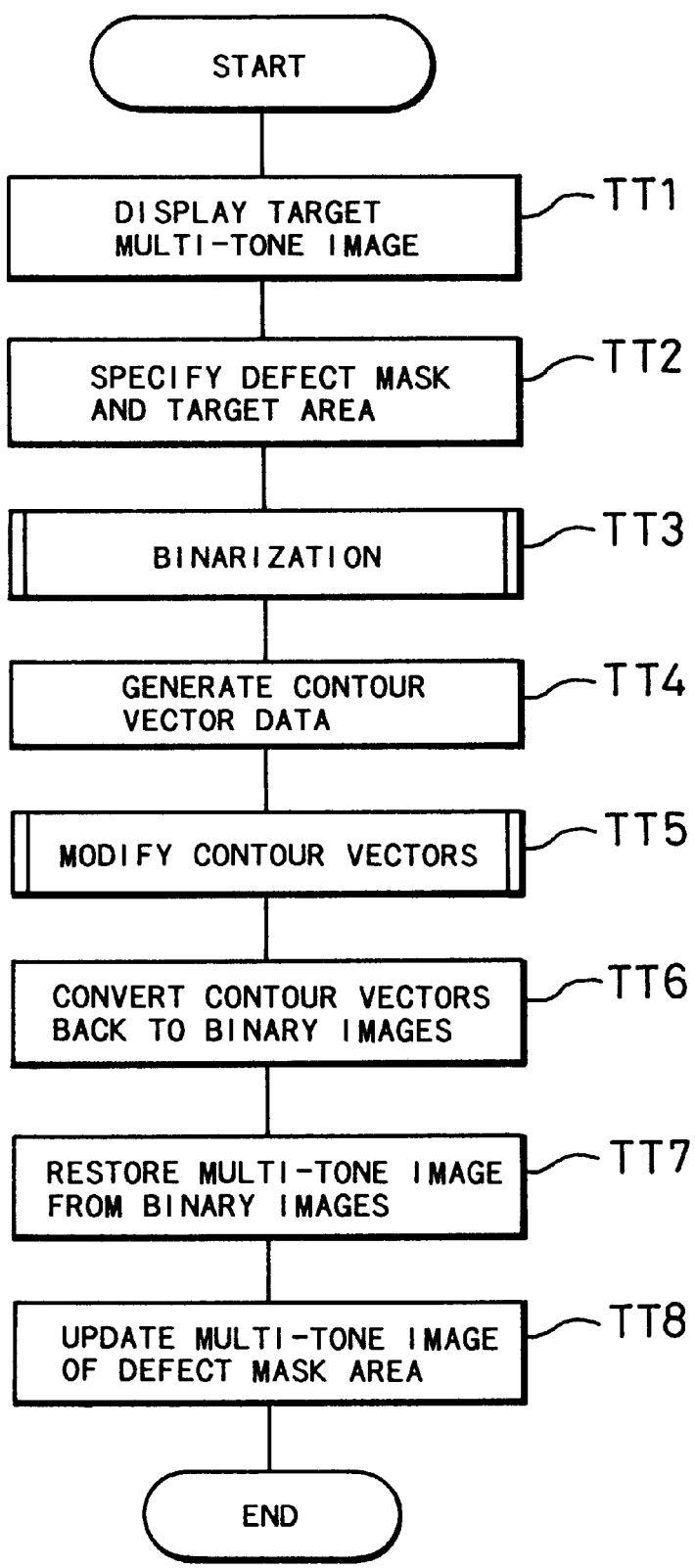
FIG. 2 is a flowchart showing steps of the processing executed in a first embodiment.
Figure 3A:
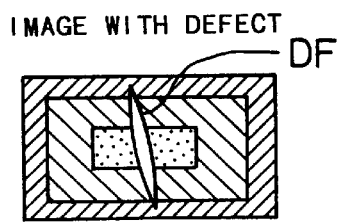
Figure 3G:
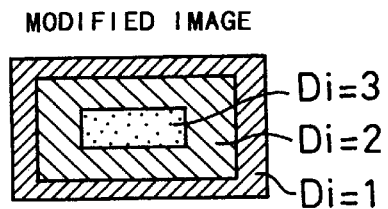

FIG. 2 is a flowchart showing steps of the processing executed in a first embodiment. FIGS. 3(A)–3(G) illustrate a concrete procedure of the processing in the first embodiment. At step TT1, an operator selects a target multi-tone image to be modified (hereinafter referred to as 'original image'), which is then displayed on the color CRT 36. FIG. 3(A) illustrates an example of displayed original image having a defect DF. In this embodiment, the original image is a color image. Multi-tone image data representing the original image include luminance data of the three primary colors of R, G, and B.

At step TT2, the operator specifies a defect mask DM and a target area SA shown in FIG. 3 (B) with the mouse 34. The defect mask DM is an area including the defect DF, for example, a rectangular area. The target area SA is a rectangular area including the defect mask DM. Multi-tone image data representing the target area SA are stored in the image data buffer 20 of the auxiliary memory 16. The defect mask DM in the multi-tone image is filled with a predetermined density (which corresponds to either white or black) by the filling unit 108 (FIG. 1). When the luminance of each color R, G, or B is expressed as 8-bit data, for example, the luminance value of each color in the defect mask DM is set equal to 255 (or equal to 0).

When the defect mask DM is set at step TT2, the contour extracting unit 106 generates mask contour vector data representing a contour of the defect mask DM (hereinafter referred to as 'mask contour'). The mask contour vector data are stored in the mask data buffer 22 of the auxiliary memory 16. In accordance with a preferable procedure, the mask contour vector data are prepared based on the defect mask DM which has been filled with a predetermined density and stored in the mask data buffer 22 in advance.

The inner area of the defect mask DM corresponds to the 'mask area' of the present invention. The mouse 34 corresponds to the mask area setting means. The mask area may be obtained by filling the defect mask DM with a predetermined density, or alternatively by filling vertices of a given geometrical figure, which surrounds a certain area including a defect with a predetermined density. The defect mask DM may have any arbitrary shape as long as it defines an area including the defect DM. The target area SA may be automatically set to be a specific area including the defect mask DM (for example, a circumscribed rectangular area about the defect mask DM).

Figure 4:
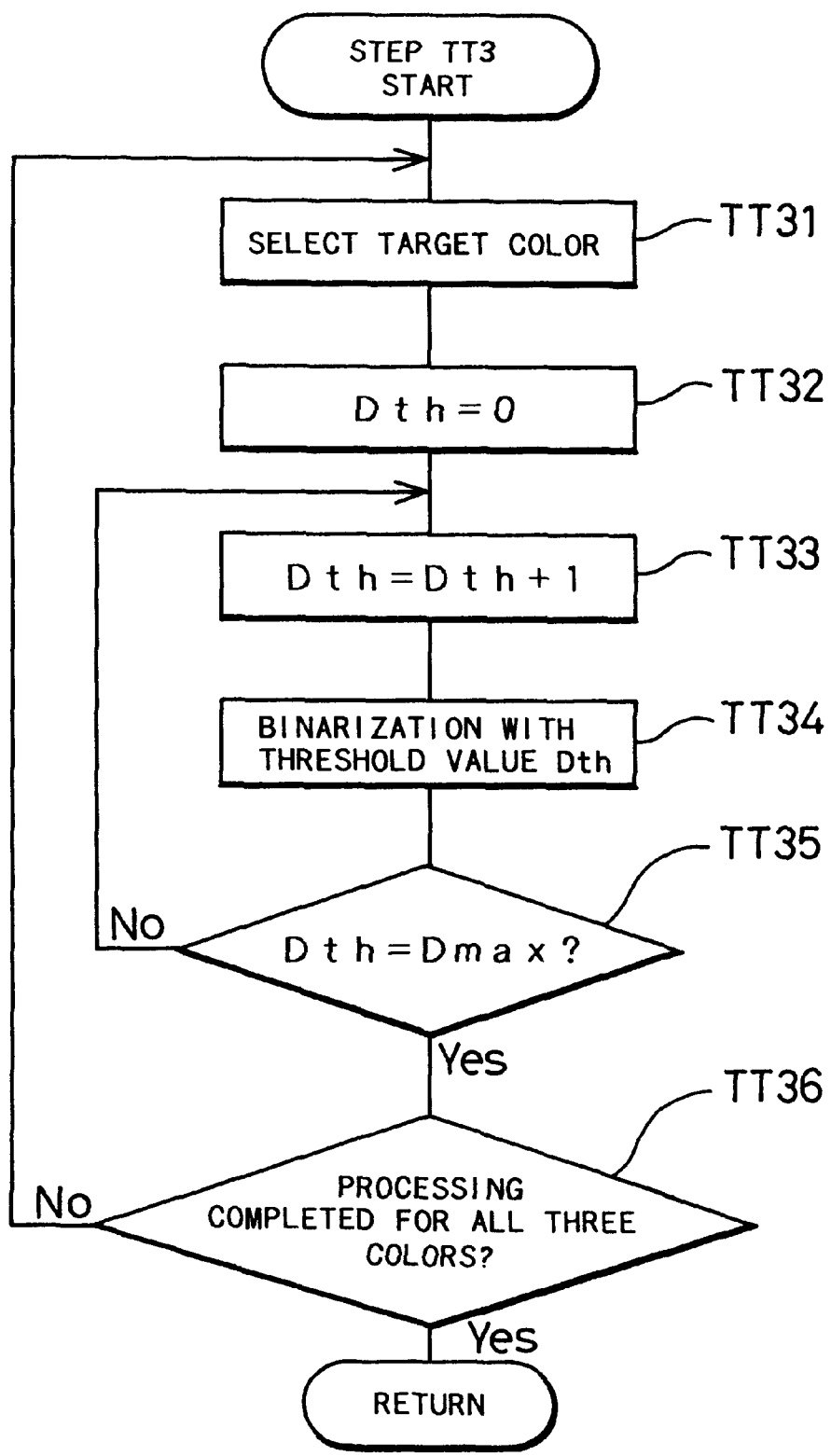
FIG. 4 is a flowchart showing details of the binarization process executed at step TT3 in the flowchart of FIG. 2.
Figure 5A:
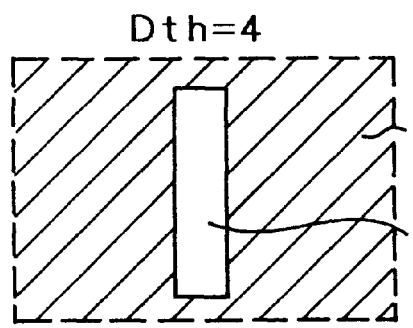
FIGS. 5(A)–5(D) show a plurality of binary images obtained by binarization process the multi-tone image of FIG. 3(B)
Figure 5B:
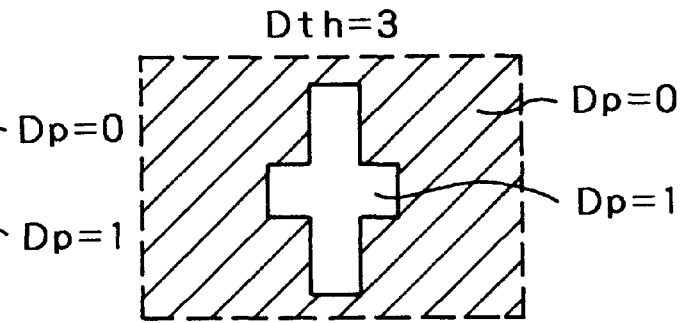
Figure 5C:
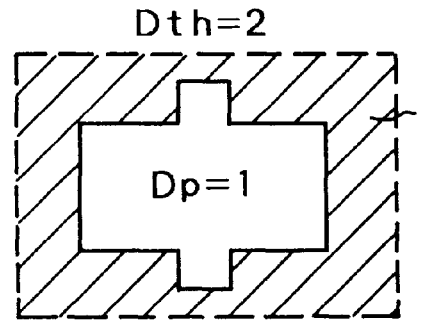
Figure 5D:
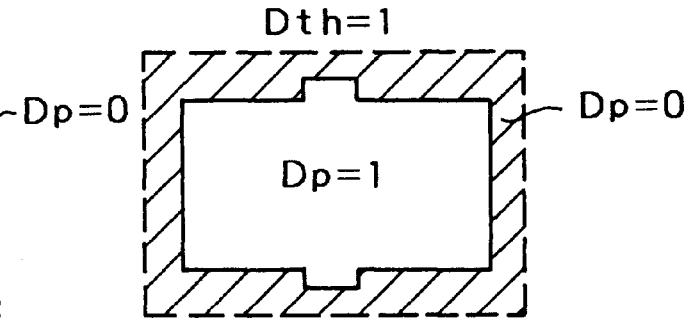
Figure 6A:
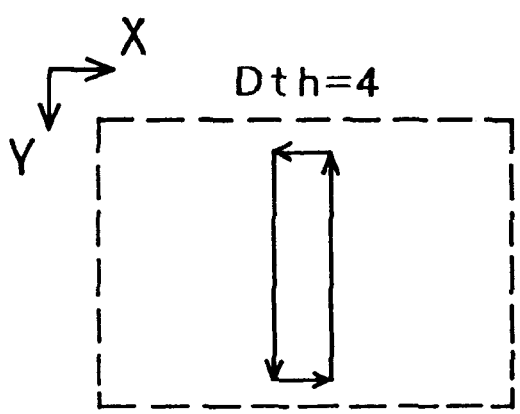
FIGS. 6(A)–6(D) show density-contour vectors corresponding to the respective binary images shown in FIGS. 5(A)–5(D)
Figure 6B:
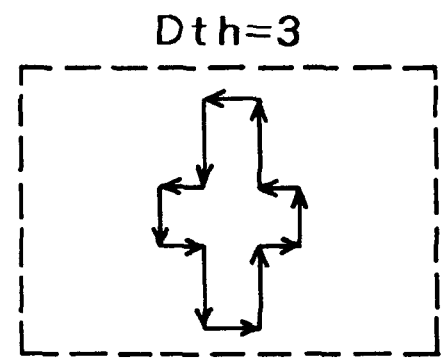
Figure 6C:
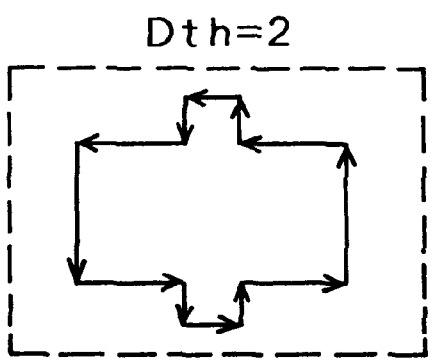
Figure 6D:
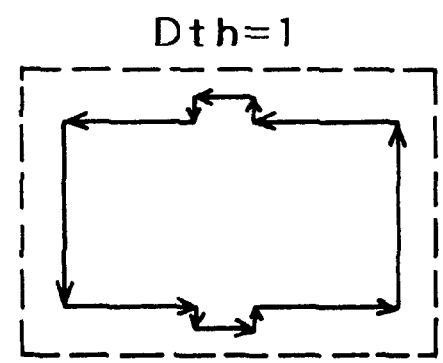

At step TT3, the binarization process unit 102 converts the multi-tone image data included in the target area SA to binary image data. FIG. 4 is a flowchart showing details of the binarization process executed at step TT3 in the flowchart of FIG. 2. At step TT31, one target color is selected among the three primary colors of R, G, and B. At step TT32, a threshold value Dth of binarization process is initialized to zero, and then increased by one at step TT33.

At step TT34, the multi-tone image data are converted to binary image data with the threshold value Dth. In accordance with a concrete procedure, the binary image data is set equal to zero (representing black) for pixels having the multi-tone image data less than the threshold value Dth, and equal to one (representing white) for those having the multi-tone image data no less than the threshold value Dth.

The current threshold value Dth is compared with a predetermined maximum value Dmax at step TT35. The predetermined maximum value Dmax is defined by the number of bits of image data; for example, the maximum value Dmax is 255 for 8-bit data. When the threshold value Dth is not equal to the predetermined maximum value Dmax, the program returns to step TT33 to increase the threshold value Dth by one, and repeats the binarization process of step TT34.

Figure 3B:
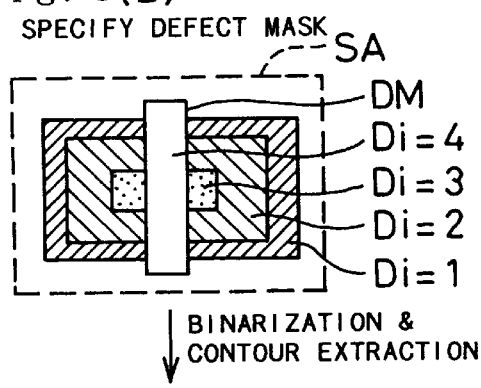

FIGS. 5(A)–5(D) show a plurality of binary images obtained by the binarization of the multi-tone image of FIG. 3(B). In the example of FIG. 3(B), for the purpose of simplicity, multi-tone image data Di in the target area SA have values in a range of 1 to 4. Since the multi-tone image data represent luminance in this embodiment, the multi-tone image data Di corresponding to the white area of the defect mask DM is equal to the maximum value '4' of the multi-tone image data. The binarization process of the multi-tone image data of FIG. 3(B) with the threshold value Dth in the range of 1 to 4 gives four binary images shown in FIGS. 5(A)–5(D). Each binary image of FIGS. 5(A)–5(D) includes a blank area having binary image data Dp equal to one, and a shaded area having the binary image data Dp equal to zero. It should be noted that each binary image includes at least part of the shape of the defect mask DM. The binary image data representing the four binary images are stored into the image data buffer 20 of the auxiliary memory 16. When the auxiliary memory 16 does not have sufficient capacity, the binary image data may be temporarily stored in the magnetic disk 38.

At step TT36 of FIG. 4, it is determined whether the binarization process has been completed for all the three primary colors of R, G, and B. When not completed, the program returns to step TT31 to select a next target color and repeats the binarization process discussed above for the next target color.

Figure 3C:
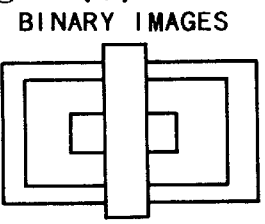
Figure 3C:
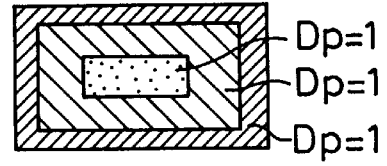
Figure 3C:
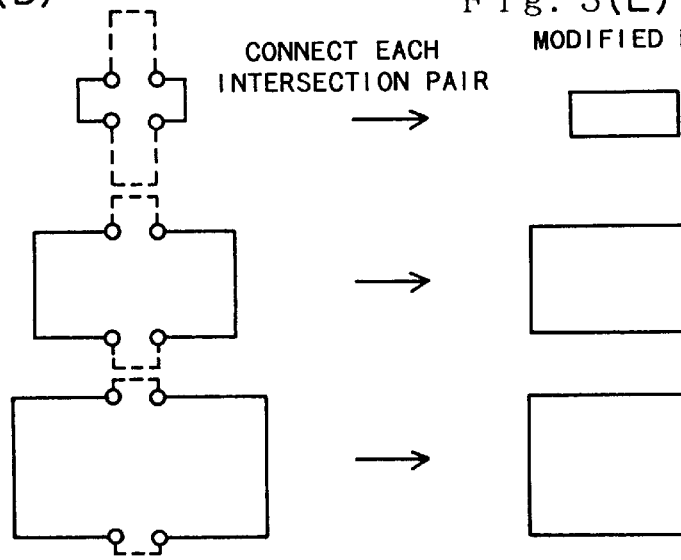

When the binarization process has been completed for all the three primary colors of R, G, and B, the program proceeds to step TT4 in the flowchart of FIG. 2. At step TT4, the contour extracting unit 106 converts each binary image data to density-contour vector data. FIGS. 6(A)–6(D) conceptually show the density-contour vectors corresponding to the respective binary images shown in FIGS. 5(A)–5(D). The density-contour vector data represents a contour of the blank area (having the binary image data Dp equal to one in FIG. 5) included in each binary image (hereinafter referred to as 'density-contour'). The binary image of FIG. 3(C) is given by overlaying the four density-contours of FIGS. 6(A)–6(D) one upon another.

The contours may be in the form of a pixel contour passing through the respective centers of pixels, or of a boundary contour tracing the boundary of pixels. Boundary contours are used in the embodiment. Each density-contour vector in this embodiment accordingly represents a boundary contour of pixels, and consists of vertical vectors parallel to a primary scanning direction Y and horizontal vectors parallel to a secondary scanning direction X. Alternatively, pixel contours may be used in place of the boundary contours.

The process of converting binary image data to contour vector data is described in the aforementioned U.S. patent application Ser. No. 08/573,599, the disclosure of which is incorporated herein by reference.

Figure 7A:
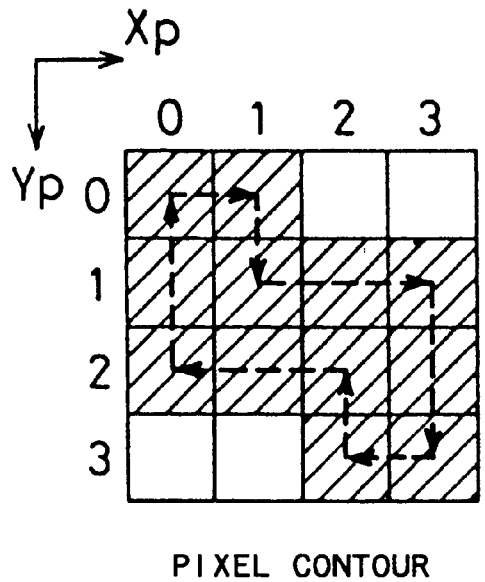
FIGS. 7(A)–7(C) show comparison between the pixel contour and the boundary contour of binary images.
Figure 7B:
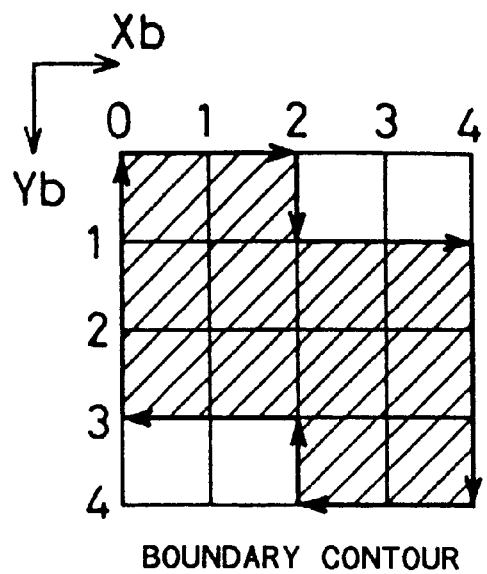
Figure 7C:
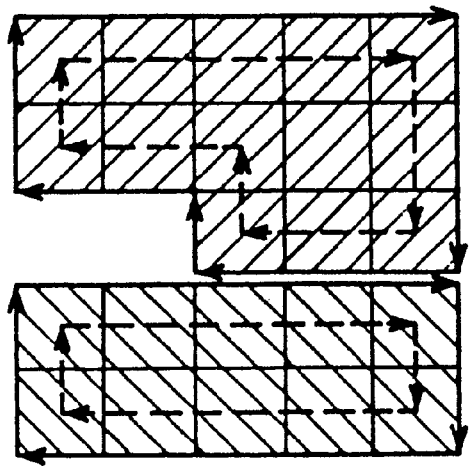

FIGS. 7(A)–7(C) show comparison between the pixel contour and the boundary contour. The pixel contour is prepared by connecting the points defined by pixel coordinates (Xp,Yp) with one another as shown in FIG. 7(A). The pixel contour vector is assumed to pass through the respective centers of pixels. The boundary contour is prepared, on the other hand, by connecting the points defined by coordinates (Xb,Yb) of boundaries between adjacent pixels (hereinafter referred to as 'boundary coordinates') with one another as shown in FIG. 7(B). The boundary contour vector is assumed to trace the boundary of pixels.

The boundary contour has the following advantages over the pixel contour:

(1) The boundary contour can represent an image area of one pixel width, whereas the pixel contour can not.

(2) When two image areas are in contact with each other as shown in FIG. 7(C), the boundary contours overlap each other. The use of boundary contours accordingly makes it easy to detect the contact of two image areas. The pixel contours, on the other hand, do not overlap each other. The use of pixel contours accordingly makes it difficult to detect the contact of image areas.

(3) When image reduction such as pixel skipping is carried out to output the image to an output apparatus having a different resolution (for example, a CRT and a printer), the reduction of the pixel contour leads to larger or more serious errors than that of the boundary contour. This is ascribed to the following reason. The configuration of the pixel contour is defined by pixels connected with one another along a route expressed by the pixel contour vector and accordingly depends upon the size of each pixel, whereas the configuration of the boundary contour is directly expressed by the boundary contour vector.

(4) Because of the reason discussed in the preceding paragraph (3), the use of pixel contours is liable to cause errors in the process of Affine transformation or other modification of image data.

Referring back to the flowchart of FIG. 2, the contour modification unit 110 (FIG. 1) modifies the respective density-contours shown in FIG. 6 at step TT5. As shown in FIG. 3(D), the contour modification process first detects intersections of the mask contour and the respective density-contours (the intersections are shown by the open circles in FIG. 3(D)), and deletes the portion of the respective density-contours which overlaps the mask contour. The intersections are then connected in pairs to yield modified density-contours as shown in FIG. 3(E).

Figure 8:
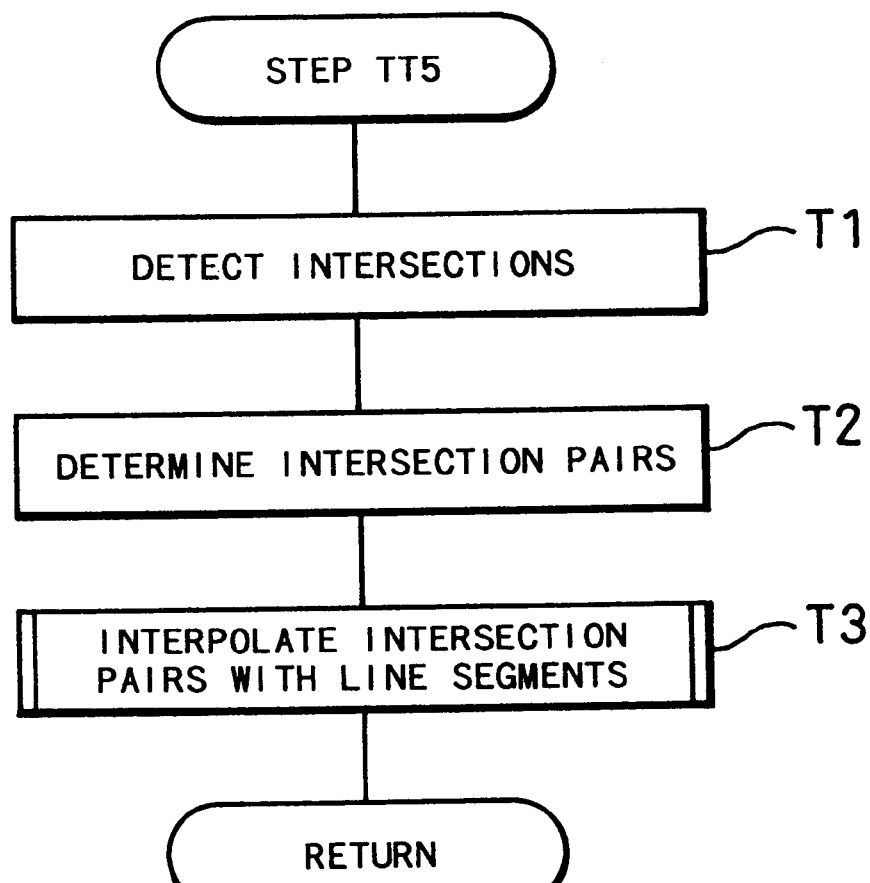
FIG. 8 is a flowchart showing details of the contour modification process executed at step TT5 in the flowchart of FIG. 2.

FIG. 8 is a flowchart showing details of the contour modification process executed at step TT5 in the flowchart of FIG. 2. FIGS. 9(A)–9(G) illustrate a concrete procedure of the contour modification process. FIGS. 9(A)–9(G) show the process of modifying the density-contour of FIG. 6(C) by way of example, and the similar processing is executed for the other density-contours.

Figure 9:
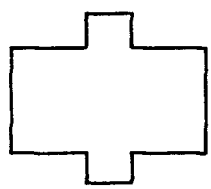
FIGS. 9(A)–9(G) illustrate a concrete procedure of the contour modification process at step TT5.
Figure 9:
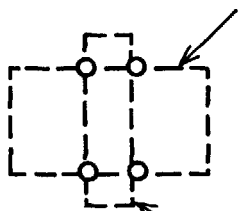
Figure 9:
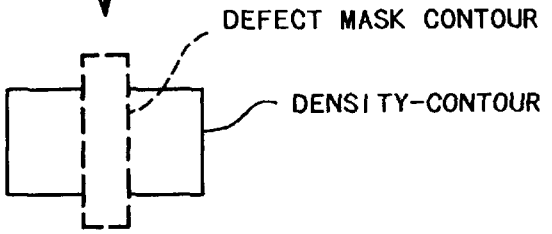
Figure 9:
Figure 9:
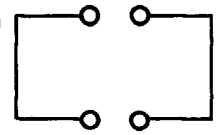

At step T1, the intersection extracting unit 120 (FIG. 1) detects intersections of the mask contour and the respective density-contours, based on the density-contour vector data representing the density-contours of the binary images and the mask contour vector data representing the mask contour. Referring to FIGS. 9(A) through 9(C), each density-contour includes the outline of the contour of a specific density area in the original image as well as the outline of the mask contour. Deletion of the portion of the density-contour which overlaps the mask contour as shown in FIG. 9(D) gives open points which are not connected with any other points. The open points are shown by the open circles in FIG. 9(E). The open points are detected as the intersections of each density-contour and the mask contour.

FIGS. 10(A)–10(D) show a concrete procedure for detecting intersections at step T1 in the flowchart of FIG. 8. The density-contour vector data includes a sequence of vector data representing the coordinates of twelve points P1 through P12 of the density-contour, which are arranged in this order. The mask contour vector data includes vector data representing the coordinates of the points P1, P6, P7, and P12 of the mask contour, which are arranged in this order.

Figure 10A:
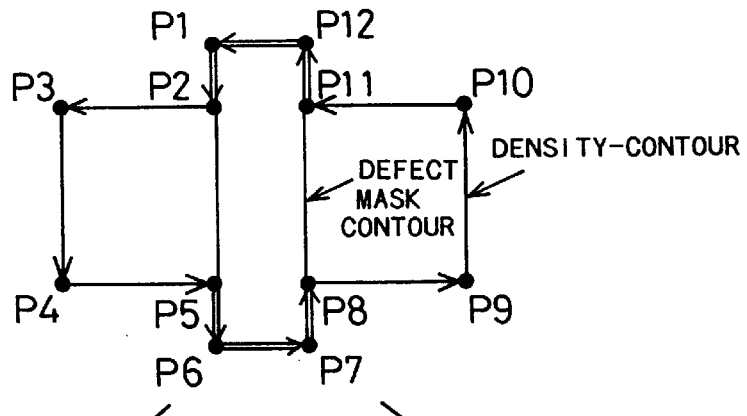
FIGS. 10(A)–10(D) show a concrete procedure for detecting intersections at step T1 in the flowchart of FIG. 8.
Figure 10B:
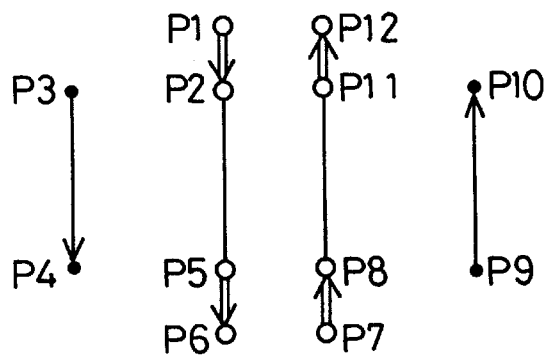
Figure 10C:
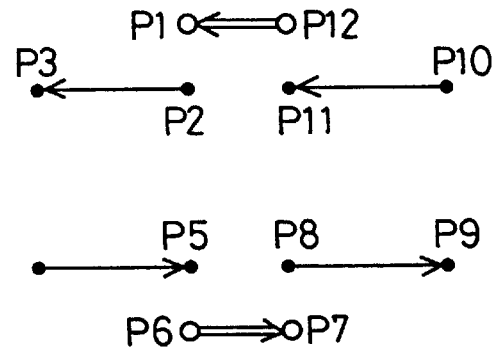
Figure 10D:
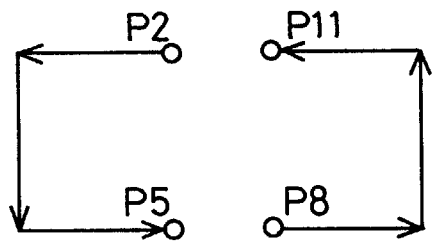

Each boundary contour vector used in this embodiment consists of vertical line segment vectors and horizontal line segment vectors. The process of detecting intersections first classifies the line segment vectors of the density-contour vector into vertical line segment vectors and horizontal line segment vectors, and sorts each set of line segment vectors according to the coordinates of the starting point of each line segment vector as shown in FIGS. 10(B) and 10(C). The classification into vertical line segment vectors and horizontal line segment vectors and subsequent sorting are also carried out for the mask contour vector.

The vertical line segment vectors of the density-contour are successively compared with the vertical line segment vectors of the mask contour, and the points existing on overlapping line segments are detected as prospective intersections. In the example of FIG. 10(B), the set of points {P1,P2,P5–P8,P22,P12} shown by the open circles are the prospective intersections. As for the horizontal line segment vectors, the set of points {P1,P6,P7,P12} shown by the open circles in FIG. 10(C) are also detected as the prospective intersections. Comparison between FIG. 10(B) and FIG. 10(C) shows that the set of points {P1,P6,P7,P12} are specified as the prospective intersections both in the vertical line segment vectors and the horizontal line segment vectors. These overlapping prospective intersections {P1,P6,P7,P12} are not free end points, but represent the portion where the density-contour completely overlaps the mask contour. Eliminating these overlapping prospective intersections {P1,P6,P7,P12} leaves a set of four intersections {P2,P5,P8,P11}, which are free end points as shown by the open circles in FIG. 10(D). In accordance with a concrete procedure, the coordinates of the overlapping prospective intersections {P1,P6,P7,P12} are deleted from the density-contour vector data. This results in eliminating the portion overlapping the mask contour from the density-contour expressed by the density-contour vector. As described above, in the preferred embodiment, the process of deleting the portion of the density-contour overlapping the mask contour shown in FIG. 9(D) is executed almost simultaneously with the process of detecting intersections shown in FIG. 9(E).

Figure 11A:
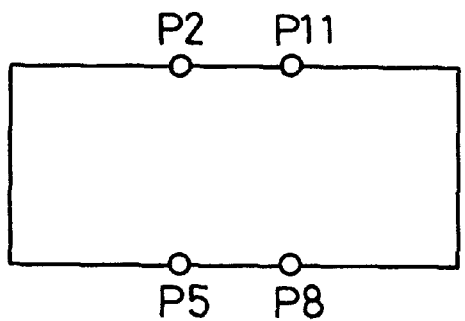
FIGS. 11(A)–11(C) show a concrete procedure for determining intersection pairs.
Figure 11B:
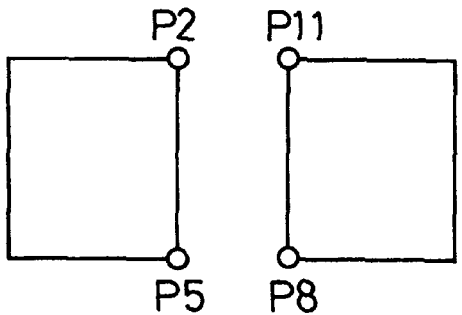
Figure 11C:
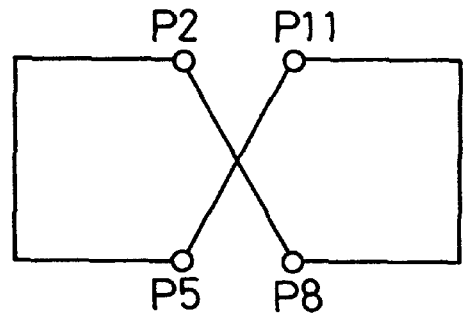

After detecting a plurality of intersections of the mask contour and each density-contour, the program proceeds to step T2 in the flowchart of FIG. 8, where the intersection pair determining unit 122 (FIG. 1) determines combinations of intersection pairs. Each 'intersection pair' denotes a pair of intersections to be connected with each other. FIGS. 11(A)–11(C) show a concrete procedure for determining intersection pairs. Three different methods of connection as shown in FIGS. 11(A) through 11(C) are applicable to connect each pair of intersections, which is selected among the four intersections {P2,P5,P8,P11}. If one line segment for connecting one pair of intersections (hereinafter referred to as 'connection line') crosses another connection line as shown in FIG. 11(C), a resulting contour is liable to become rather unnatural and be quite different from the proper density-contour of the original image. In this embodiment, the intersection pairs are determined so as to prevent the connection lines from crossing over each other. In accordance with a concrete procedure, the intersections are combined into a plural sets of intersection pairs, and the lengths of connection lines for connecting the intersection pairs are summed up. For all the possible combinations of intersection pairs selected among the plurality of intersections, the respective sums of the lengths of connection lines are compared with one another. A specific combination of intersection pairs giving the minimum sum is then selected among the possible combinations. In the example of FIGS. 11(A)–11(C), the combination of FIG. 11(A) gives the minimum sum of the lengths of connection lines as expressed by the inequality on the bottom of the drawings. The intersection pairs {P2,P11} and {P5,P8} shown in FIG. 11(A) are thus selected for connection.

Figure 9F:
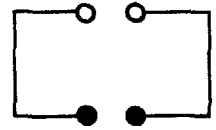
Figure 9G:

The program then proceeds to step T3 in the flowchart of FIG. 8, at which the intersection pair connecting unit 124 (FIG. 1) draws connection lines to connect each pair of intersections as shown in FIGS. 9(F) and 9(G) and thereby yields a modified density-contour. Details of the intersection pair connecting process will be described later.

As a result of the contour modification process, the portion of the each density-contour overlapping the mask contour is deleted to thereby produce modified density-contours as shown in FIG. 3(E). Referring back to the flowchart of FIG. 2, the program proceeds to step TT6, at which a plurality of modified density-contour vector data representing the plurality of modified density-contours are converted back to binary images. FIG. 3(F) shows modified binary images which are laid one upon another.

The process of conversion of contour vector data to binary images is described in the aforementioned U.S. patent application Ser. No. 08/573,599, the disclosure of which is incorporated herein by reference.

At subsequent step TT7 in the flowchart of FIG. 2, the multi-tone image restoring unit 112 (FIG. 1) converts the binary images back to a multi-tone image. As shown in FIG. 3(F), an inner area (blank area) of each binary image has the binary image data Dp equal to the value '1'. Therefore, simple summation of the binary image data Dp for the respective pixels will give modified multi-tone image data shown in FIG. 3(G).

As discussed above, the process applied to the embodiment comprising the steps of: converting a multi-tone image to a plurality of binary images; deleting a portion of a density-contour of each binary image overlapping a mask contour; and connecting each pair of intersections of the mask contour and each density-contour to modify the respective density-contours. The embodiment accordingly attains modification of density-contours without carrying out any contraction or expansion of binary images or contours. This significantly lowers the possibility of mistakenly eliminating fine parts of contours in the original image.

D. Details of Intersection Pair Connecting Process

Figure 12:
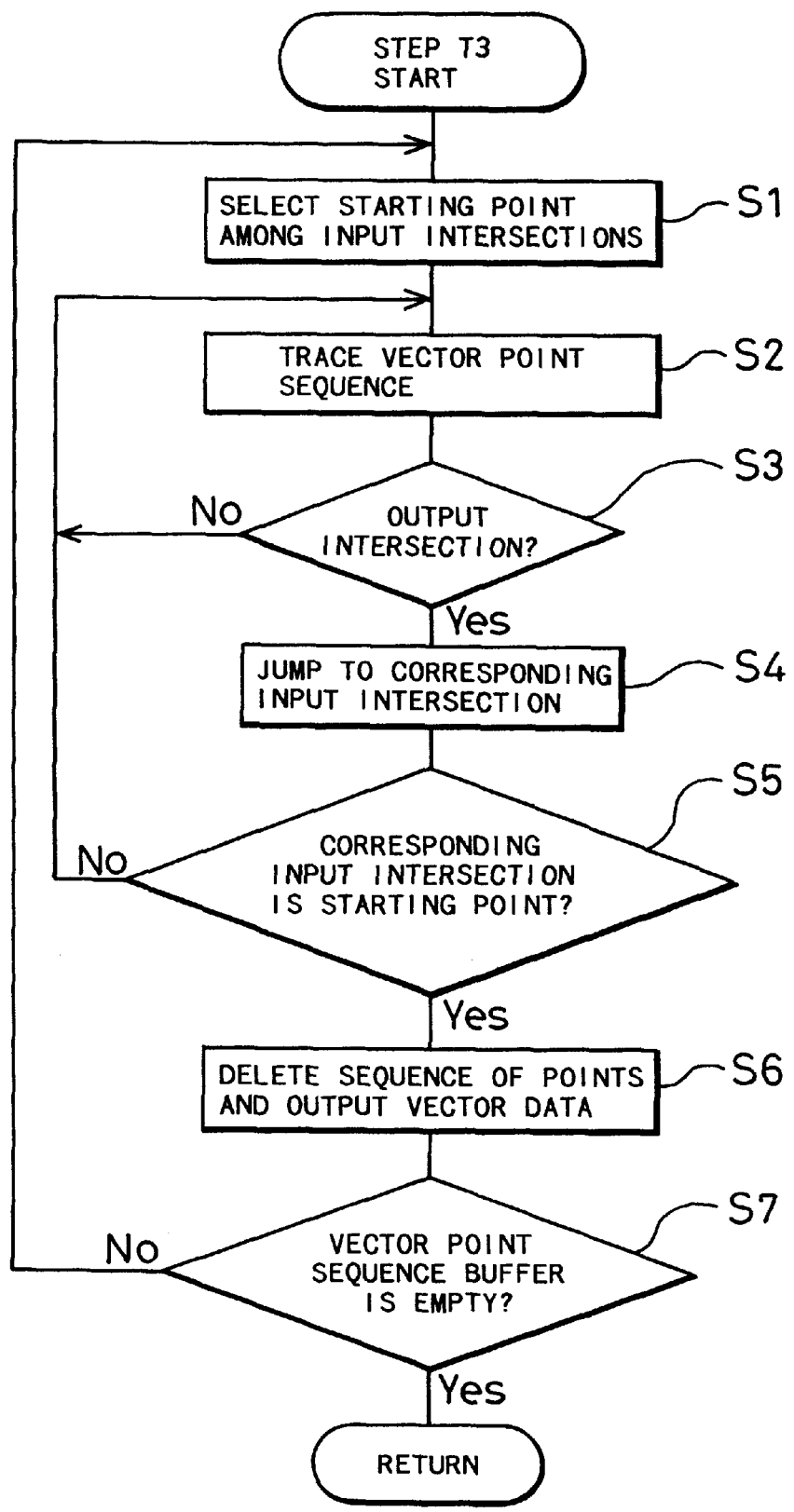
FIG. 12 is a flowchart showing details of the intersection pair connecting process executed at step T3 in the flowchart of FIG. 8.

FIG. 12 is a flowchart showing details of the intersection pair connecting process executed by the intersection pair connecting unit 124 at step T3 in the flowchart of FIG. 8. FIGS. 13(A), 13(B) through 23(A) and 23(B) show concrete procedures of the processing. FIGS. 13(A) through 23(A) show data stored in the contour-extracting data buffer 24 (FIG. 1) and used for the intersection pair connecting process. FIGS. 13(B) through 23(B) illustrate contour vectors subject to the processing.

Figures 13A, 13B:
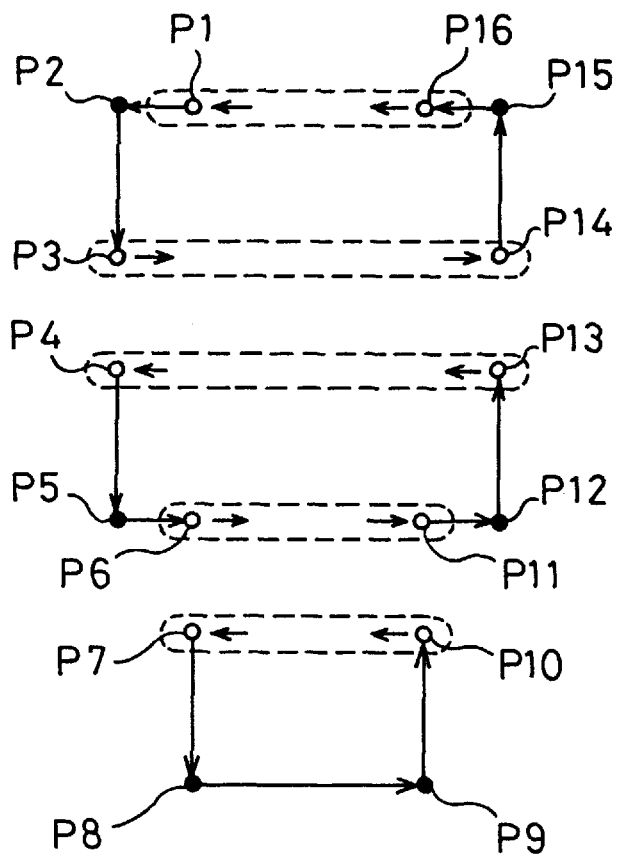
FIGS. 13(A) and 13(B) show an initial state in the intersection pair connecting process.

FIGS. 13(A) and 13(B) show an initial state of the intersection pair connecting process. The contour vectors shown in FIG. 13(B) include sixteen points P1–P16. The coordinates of these points are stored in a vector point sequence buffer as shown in the center column of FIG. 13(A). In this example, five pairs of intersections {P16,P1}, {P3,P14}, {P13,P4}, {P6,P11}, and {P10,P7} surrounded by the broken lines in FIG. 13(B) are detected. Intersection pair data representing the pairs of intersections are stored in an intersection pair data buffer.

The line segment vectors included in the contour vectors are arranged in a predetermined circulation direction: clockwise or counterclockwise. The line segment vectors for connecting the respective intersection pairs follow the predetermined circulation direction. In order to distinguish the two intersections of each intersection pair, the first intersection from which a line segment vector for interpolating the intersection pair starts is referred to as 'output intersection', while the second intersection at which the interpolating line segment vector ends is referred to as 'input intersection'. By way of example, as to the intersection pair {P16,P1}, the intersection P16 is an output intersection and the intersection P1 is an input intersection. In the left column of FIG. 13(A), each pair of intersections in braces {} include an output intersection POUT on the left hand side and an input intersection PIN on the right hand side.

The 'detected-vector buffer' shown in the right end column of FIG. 13(A) stores contour vector data consisting of the points which are traced in the intersection pair connecting process. As described below, the intersection pair connecting process traces a sequence of points of the contour vectors and stores the traced sequence of points into the detected-vector buffer. When the sequence of points constitute a closed figure, the coordinates of the sequence of points registered in the detected-vector buffer are output as closed-contour vector data.

Referring to FIG. 13(A), in the initial state prior to the process of connecting each intersection pair, the intersection pair data {POUT,PIN} and the vector point sequence data are stored in the contour-extracting data buffer 24. The term 'NULL' shown in the detected-vector buffer indicates that there is no data stored.

Figures 14A, 14B:
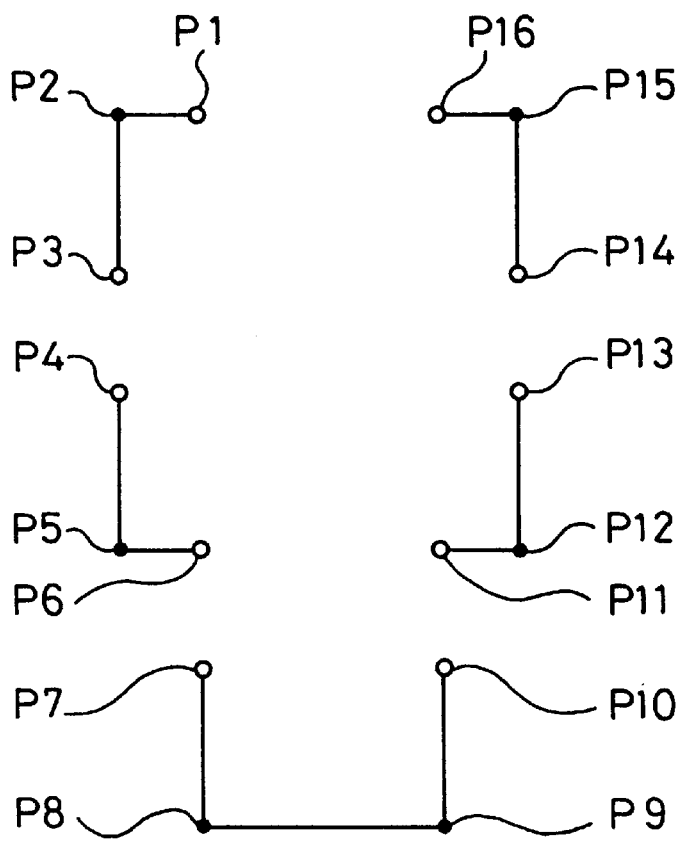
FIGS. 14(A) and 14(B) show an intermediate state in the intersection pair connecting process.

When the program enters the intersection pair connecting routine shown in the flowchart of FIG. 12, one of the input intersections PIN of the intersection pairs is selected as a starting point used for tracing contour vectors at step S1. FIGS. 14(A) and 14(B) show the state in which the input intersection P1 of the first intersection pair {P16,P1} has been selected as the starting point at step S1. In accordance with a concrete procedure, the coordinates of the input intersection P1 selected as the starting point of tracing are registered in the detected-vector buffer at step S1. The reason for selecting the input intersection PIN as the starting point of tracing is that tracing of a sequence of vectors from the input intersection makes it easy to detect formation of closed contour vectors when the output intersection POUT corresponding to the starting point is traced. In the drawings of FIGS. 14(A) through 23(A), the points traced in the vector point sequence are underlined.

Figures 15A, 15B:
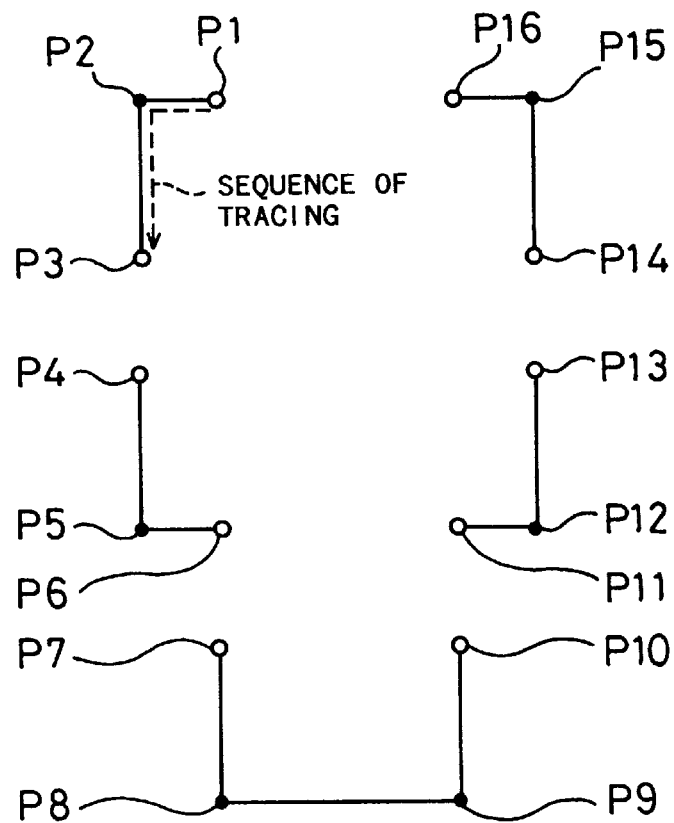
FIGS. 15(A) and 15(B) show another intermediate state in the intersection pair connecting process.
Figures 16A, 16B:
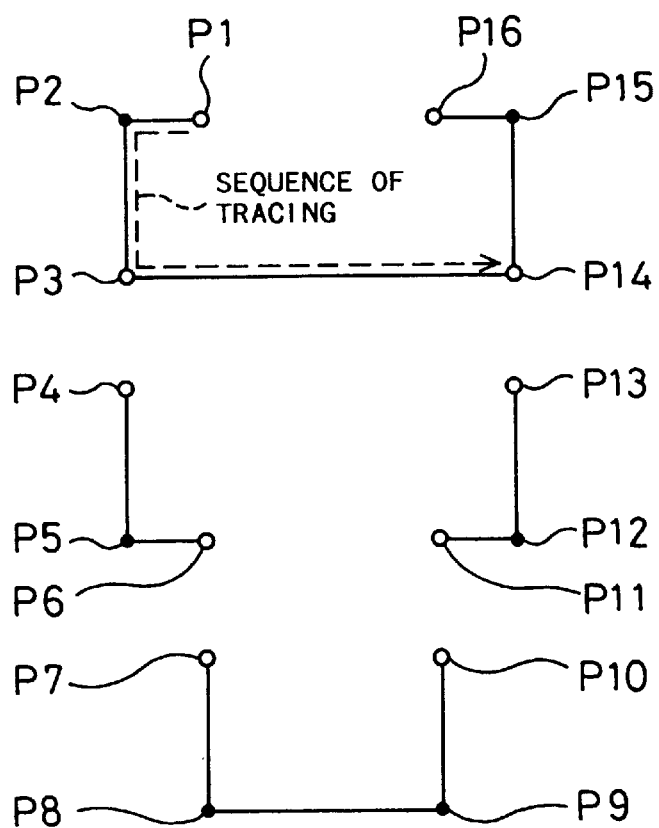
FIGS. 16(A) and 16(B) show still another intermediate state in the intersection pair connecting process.

At step S2 in the flowchart of FIG. 12, the vector point sequence (see in the center column of FIG. 14(A)) is traced and a next point is added to the detected-vector buffer. At subsequent step S3, it is determined whether the next point is an output intersection. When the next point is not an output intersection, the program returns to step S2 to continue tracing of the sequence of vector points. FIGS. 15(A) and 15(B) show the state in which the vector point sequence has been traced from the starting point P1 through the third point P3. The third point P3 has been registered as an output intersection in the intersection pair data buffer. In this case, the program proceeds to step S4 in the flowchart of FIG. 12, at which the tracing is jumped to the input intersection corresponding to the output intersection. FIGS. 16(A) and 16(B) show the state in which the input intersection P14 corresponding to the point P3 has been added to the detected-vector buffer at step S4. The sequence of points registered in the detected-vector buffer represent those which are to be successively connected to one another via line segment vectors. As to the contour which is expressed by the data stored in the detected vector buffer shown in FIG. 16(A), the point P3 is directly connected to the point P14 as shown in FIG. 16(B).

At step S5 in the flowchart of FIG. 12, it is determined whether the input intersection to which the tracing has been jumped at step S4 is the starting point P1 of the contour vectors. When it is not the starting point P1, the program returns to step S2 to continue tracing the vector point sequence. In the state of FIGS. 16(A) and 16(B), the input intersection P14 does not coincide with the starting point P1, and therefore the tracing of the vector point sequence is continued.

Figures 17A, 17B:
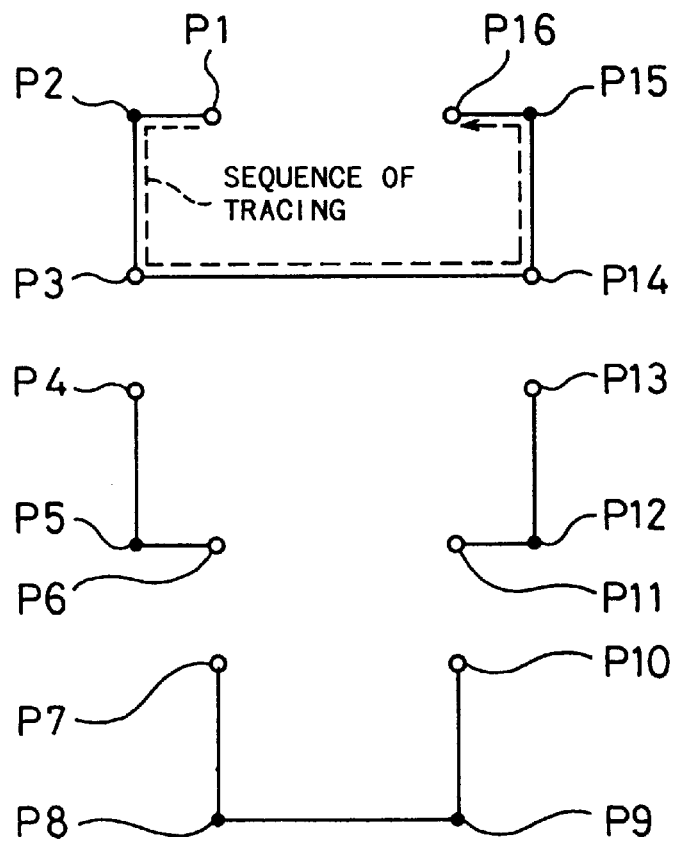
FIGS. 17(A) and 17(B) show another intermediate state in the intersection pair connecting process.
Figures 18A, 18B:
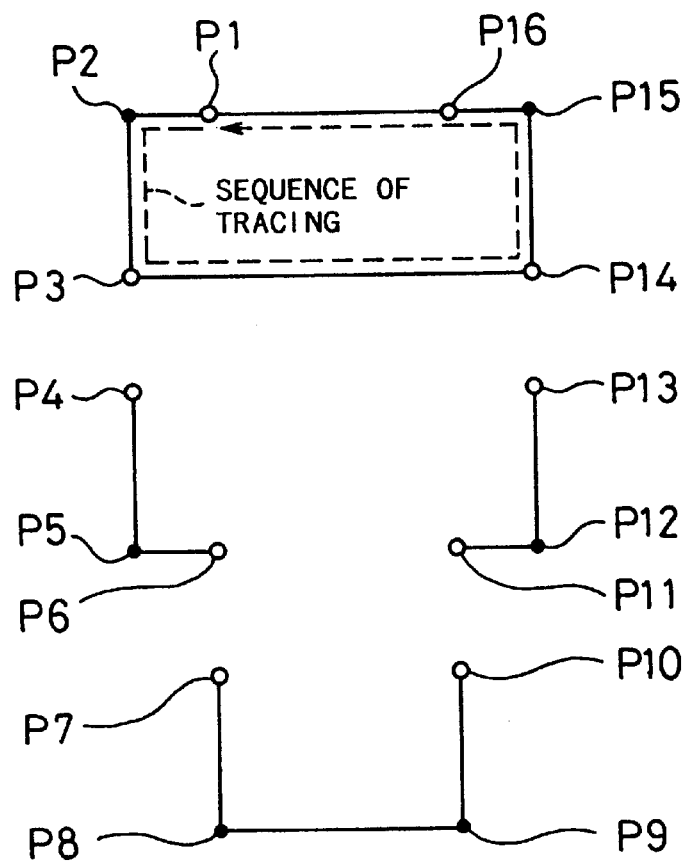
FIGS. 18(A) and 18(B) show another intermediate state in the intersection pair connecting process.

FIGS. 17(A) and 17(B) show the state in which the processing of steps S2 and S3 has been repeated after the state of FIGS. 16(A) and 16(B) and the vector point sequence has been traced to a point P16. Since the point P16 has been registered as an output intersection in the intersection pair data buffer, the program proceeds to step S4 at which the tracing is jumped to its corresponding input intersection P1. FIGS. 18(A) and 18(B) show the state in which the tracing has been jumped from the output intersection P16 to the corresponding input intersection P1. The input intersection P1 is the starting point of the contour vectors stored in the detected-vector buffer. This means that the contour vectors form a closed figure. In this case, the program goes from step S5 to step S6 in the flowchart of FIG. 12.

Figures 19A, 19B:
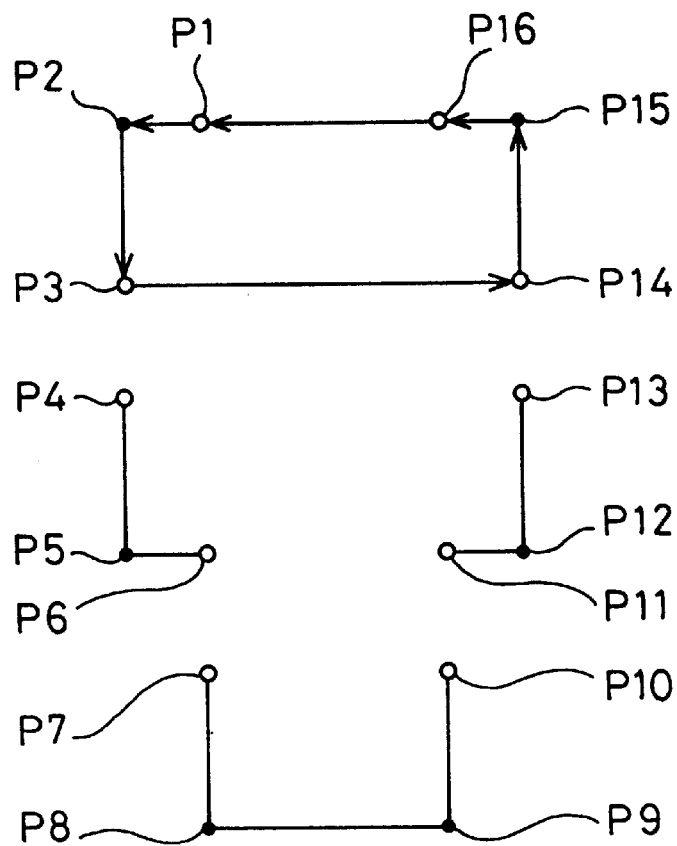
FIGS. 19(A) and 19(B) show still another intermediate state in the intersection pair connecting process.

At step S6, the point sequence which forms the closed figure is deleted from the intersection pair data buffer and from the vector point sequence buffer, and the vector data stored in the detected-vector buffer are output to other device. FIGS. 19(A) and 19(B) show the results of the processing executed at step S6. In accordance with a concrete procedure, the processing of step S6 deletes the data of the points registered in the detected-vector buffer from the intersection pair data buffer and from the vector point sequence buffer, and outputs the vector data registered in the detected-vector buffer as closed-contour vector data to a contour vector data memory. The contour vector data memory is mapped in the contour-extracting data buffer 24 shown in FIG. 1. After completing the output of the vector data, the data stored in the detected-vector buffer are also deleted.

At step S7 in the flowchart of FIG. 12, it is determined whether the vector point sequence buffer is empty or not. When the vector point sequence buffer is not empty, the program returns to step S1 to select a new starting point and continue to trace the vector point sequence.

Figures 20A, 20B:
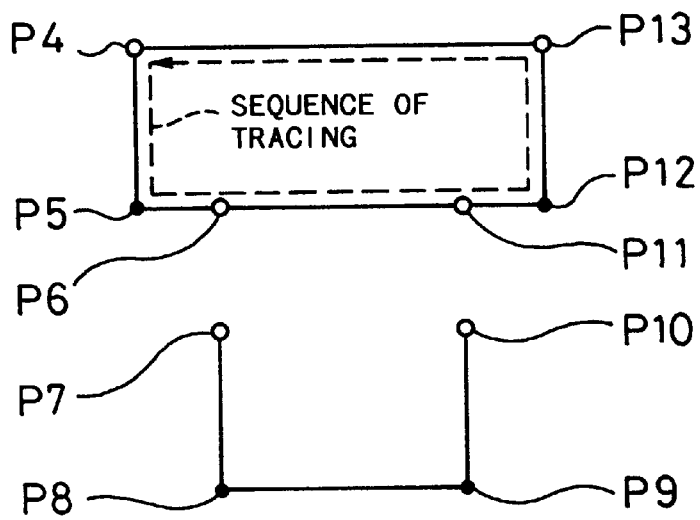
FIGS. 20(A) and 20(B) show another intermediate state in the intersection pair connecting process.
Figures 21A, 21B:
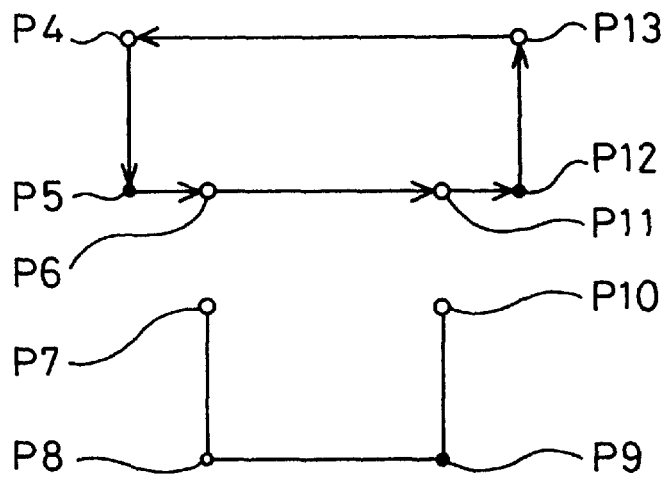
FIGS. 21(A) and 21(B) show another intermediate state in the intersection pair connecting process.

FIGS. 20(A) and 20(B) show the state in which second closed-contour vectors including a starting point P4 has been formed. FIGS. 21(A) and 21(B) show the state in which the data of the points forming the second closed-contour vectors have been deleted from the intersection pair data buffer and from the vector point sequence buffer, and the vector data of the closed contour registered in the detected-vector buffer are output.

Figures 22A, 22B:
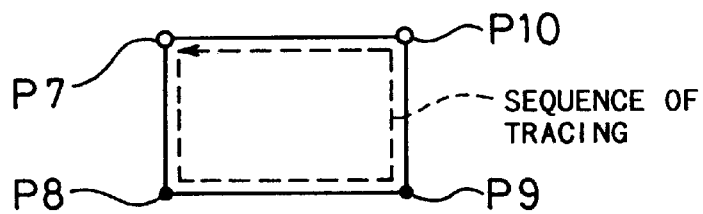
FIGS. 22(A) and 22(B) show still another intermediate state in the intersection pair connecting process.
Figures 23A, 23B:
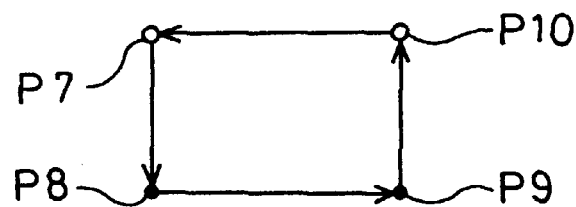
FIGS. 23 (A) and 23(B) show a final state in the intersection pair connecting process.

FIGS. 22(A) and 22(B) show the state in which third closed-contour vectors including a starting point P7 has been formed. FIGS. 23(A) and 23(B) show the state in which the data of the points forming the third closed-contour vectors have been deleted from the intersection pair data buffer and from the vector point sequence buffer, and the vector data of the closed contour registered in the detected-vector buffer are output.

As discussed above, the intersection pair connecting process traces a sequence of vector points. Every time when contour vectors representing a closed figure are obtained, the data of the contour vectors are stored as a set of closed-contour vector data into the memory. Even when a plurality of closed contours are included in one binary image as shown in the example of FIG. 13(B), this process easily extracts each set of closed-contour vectors while connecting the intersection pairs.

E. Second Embodiment

FIGS. 24(A)–24(E) show a concrete procedure of the processing executed in a second embodiment according to the present invention, which correspond to those of FIG. 3. The processing of the second embodiment follows the routine shown in the flowchart of FIG. 2, except that the processing executed at steps TT3 through TT5 is a little different from that of the first embodiment.

Figure 24A:
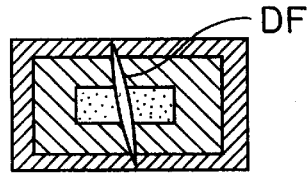
FIGS. 24(A)–24(E) show a concrete procedure of the processing executed in a second embodiment according to the present invention.
Figure 24B:
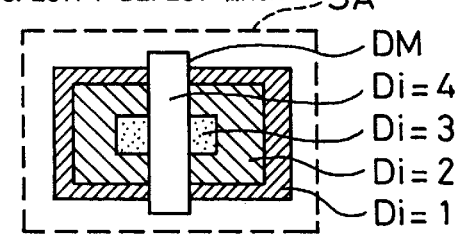
Figure 24C:
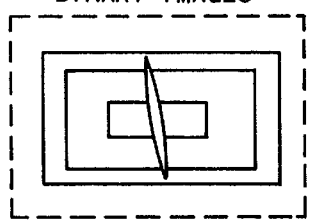
Figure 24D:
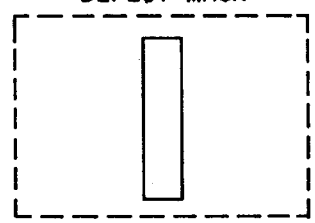
Figure 24E:
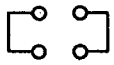
Figure 24E:
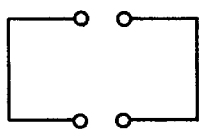
Figure 24E:
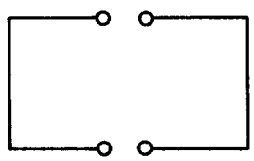

The process of specifying a defect mask DM in the second embodiment is identical with that of the first embodiment, and FIGS. 24(A) and 24(B) are thus identical with FIGS. 3(A) and 3(B). The following describes the difference between the second embodiment and the first embodiment in the binarization process and the contour extracting process. Referring to FIG. 24(C), an original multi-tone image without the defect mask is converted to binary images, and contour vector data of the binary images are generated. Contour vector data representing the mask contour of the defect mask are separately generated in the same manner as the first embodiment (FIG. 24(D)). The contour modifying process deletes a portion included in the mask contour of the defect mask from the density-contour of each binary image and determines intersections of the mask contour and the respective density-contours (FIG. 24(E)). The expression 'a portion included in the mask contour' herein implies a portion either surrounded by or overlapping the mask contour. Deleting a portion included in the mask contour from each density-contour has similar effects to those of the first embodiment, in which a portion overlapping the mask contour is deleted from each density-contour. The state of FIG. 24(E) is accordingly identical with the state after the intersection detecting process (step T1 in the flowchart of FIG. 8) of the first embodiment has been completed. The subsequent processing follows the steps of the first embodiment.

The second embodiment has an advantage of realizing modification of contours without filling the area of the defect mask DM in the multi-tone image. However, in the first embodiment, the binary images do not include any defect, and they have simpler density-contours than those of the second embodiment accordingly. This feature enables to execute the contour modifying process more rapidly.

F. Modification

The present invention is not restricted to the above embodiments or applications, but there may be many modifications, changes, and alterations without departing from the scope or spirit of the essential characteristics of the present invention. An example of possible modification is given below.

Figure 25A:
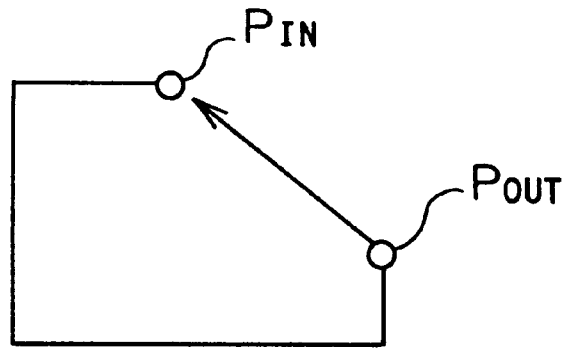
FIGS. 25(A)–25(C) show a variety of different methods of connecting each intersection pair.
Figure 25B:
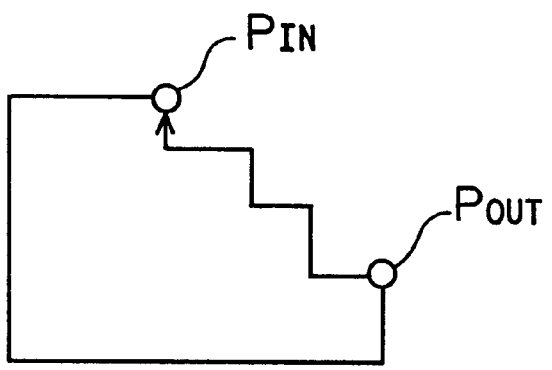
Figure 25C:
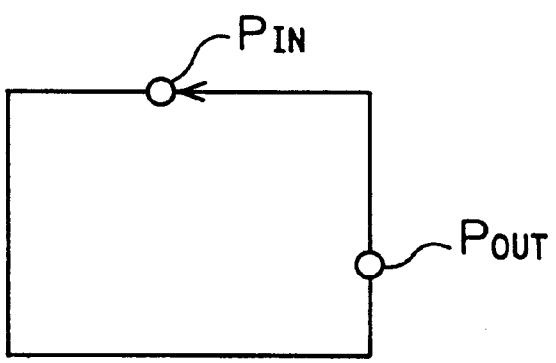

(1) FIGS. 25(A)–25(C) show a variety of different methods of connecting each intersection pair. In the example of FIG. 25(A), one linear line segment vector connects or interpolates the output intersection POUT and the input intersection PIN. In the example of FIG. 25(B), a combination of vertical line segment vectors and horizontal line segment vectors attain a step-like connection. The size of each step may be the width of one pixel or alternatively the width of a predetermined number of pixels. In the example of FIG. 25(C), one vertical line segment vector and one horizontal line segment vector connect the intersection points. A variety of other methods of connecting each intersection pair may also be applicable to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for modifying a multi-tone image, comprising:

mask area setting means for specifying a mask area as a target area of modification in the multi-tone image;

binarization means for converting multi-tone image data representing the multi-tone image to a plurality of binary image data with a plurality of threshold values;

contour extracting means for generating mask-contour vector data representing a contour of said mask area, and generating a plurality of density-contour vector data representing contours of binary images represented by the plurality of binary image data;

intersection detecting means for detecting a plurality of intersections of each density-contour expressed by each of the plurality of density-contour vector data and said mask-contour expressed by the mask-contour vector data;

modification means for connecting the plurality of intersections, which are included in said each density-contour expressed, in pairs to make said each density-contour to be a closed figure, and generating a plurality of modified contour vector data, each said modified contour vector data representing said each closed density-contour; and restoration means for converting said plurality of modified contour vector data to modified multi-tone image data.

2. An apparatus in accordance with claim 1, wherein said intersection extracting means comprises:

deletion means for deleting a portion overlapping said mask-contour from said each density-contour.

3. An apparatus in accordance with claim 2, wherein said modification means comprises:

intersection pair determination means for determining a combination of intersection pairs, which are to be connected with each other, among the plurality of intersections; and intersection pair connecting means for connecting each said intersection pair to make said density-contour to be a closed figure.

4. An apparatus in accordance with claim 3, wherein said intersection pair determination means comprises:

means for determining the combination of intersection pairs so as to prevent a plurality of connecting lines connecting said respective intersection pairs from crossing over one another.

5. An apparatus in accordance with claim 1, wherein said intersection detecting means comprises:

deletion means for deleting a portion included in said mask-contour from said each density-contour.

6. An apparatus in accordance with claim 5, wherein said modification means comprises:

intersection pair determination means for determining a combination of intersection pairs, which are to be connected with each other, among the plurality of intersections; and intersection pair connecting means for connecting each said intersection pair to make said density-contour to be a closed figure.

7. An apparatus in accordance with claim 6, wherein said intersection pair determination means comprises:

means for determining the combination of intersection pairs so as to prevent a plurality of connecting lines connecting said respective intersection pairs from crossing over one another.

8. An apparatus for modifying a multi-tone image, comprising:

mask area setting means for specifying a mask area as a target area of modification in the multi-tone image;

filling means for filling said mask area in the multi-tone image with a predetermined density;

binarization means for converting multi-tone image data representing the multi-tone image including said filled mask area to a plurality of binary image data with a plurality of threshold values;

contour extracting means for generating mask-contour vector data representing a contour of said mask area, and converting said plurality of binary image data to a plurality of density-contour vector data, each said density-contour vector data representing a contour of a binary image represented by each said binary image data;

intersection detecting means for detecting a plurality of intersections of each density-contour expressed by each of the plurality of density-contour vector data and said mask-contour expressed by the mask-contour vector data and for deleting a portion overlapping said mask-contour from said each density-contour;

modification means for connecting the plurality of intersections, which are included in said each density-contour, in pairs to make said each density-contour to be a closed figure, and for generating a plurality of modified contour vector data, each said modified contour vector data representing said each closed density-contour; and restoration means for converting said plurality of modified contour vector data to modified multi-tone image data.

9. An apparatus for modifying a multi-tone image, comprising:

means for specifying a mask area as a target area of modification in the multi-tone image;

means for generating a plurality of binary images by binarization said multi-tone image with a plurality of threshold values;

means for extracting a plurality of density-contours corresponding to said plurality of binary images;

means for deleting a portion overlapping with a contour of said mask area from each said density-contour without carrying out image contraction and image expansion; and means for converting the plurality of density-contours, from which the contour of said mask area has been deleted, to a modified multi-tone image.

10. An apparatus in accordance with claim 9, wherein said means for deleting comprises:

means for detecting a plurality of intersections of said each density-contour and the contour of said mask area, and connecting said plurality of intersections in pairs when deleting the portion overlapping with the contour of said mask area from each density-contour.

11. An apparatus for modifying a multi-tone image, comprising:

means for specifying a mask area as a target area of modification in the multi-tone image;

means for generating a plurality of binary images by binarization of said multi-tone image with a plurality of threshold values;

means for extracting a plurality of density-contours corresponding to said plurality of binary images;

means for deleting a portion included in a contour of said mask area from each said density-contour without carrying out image contraction and image expansion; and means for converting the plurality of density-contours, from which the contour of said mask area has been deleted, to a modified multi-tone image, wherein said means for deleting comprises:

means for deleting a plurality of intersections of said each density-contour and the contour of said mask area, and connecting said plurality of intersections in pairs when deleting the portion included in the contour of said mask area from each density-contour.

12. A method of modifying a multi-tone image, said method comprising the steps of:

(a) specifying a mask area as a target area of modification in the multi-tone image;

(b) converting multi-tone image data representing the multi-tone image to a plurality of binary image data with a plurality of threshold values;

(c) generating mask-contour vector data representing a contour of said mask area, and generating a plurality of density-contour vector data representing contours of binary images represented by the plurality of binary image data;

(d) detecting a plurality of intersections of each density-contour expressed by each of the plurality of density-contour vector data and said mask-contour expressed by the mask-contour vector data;

(e) connecting the plurality of intersections, which are included in said each density-contour expressed, in pairs to make said each density-contour to be a closed figure, and generating a plurality of modified contour vector data, each said modified contour vector data representing said each closed density-contour; and (f) converting said plurality of modified contour vector data to modified multi-tone image data.

13. A method in accordance with claim 12, wherein said step (d) comprises the step of:

deleting a portion overlapping said mask-contour from said each density-contour.

14. A method in accordance with claim 13, wherein said step (e) comprises the steps of:

determining a combination of intersection pairs, which are to be connected with each other, among the plurality of intersections; and connecting each said intersection pair to make said density-contour to be a closed figure.

15. A method in accordance with claim 14, wherein said step of determining a combination of intersection pairs comprises the step of:

determining the combination of intersection pairs so as to prevent a plurality of connecting lines connecting said respective intersection pairs from crossing over one another.

16. A method in accordance with claim 12, wherein said step (d) comprises the step of:

deleting a portion included in said mask-contour from said each density-contour.

17. A method in accordance with claim 16, wherein said step (e) comprises the steps of:

determining a combination of intersection pairs, which are to be connected with each other, among the plurality of intersections; and connecting each said intersection pair to make said density-contour to be a closed figure.

18. A method in accordance with claim 17, wherein said step of determining a combination of intersection pairs comprises the step of:

determining the combination of intersection pairs so as to prevent a plurality of connecting lines connecting said respective intersection pairs from crossing over one another.

19. A method for modifying a multi-tone image, said method comprising the steps of:

specifying a mask area as a target area of modification in the multi-tone image;

filling said mask area in the multi-tone image with a predetermined density;

converting multi-tone image data representing the multi-tone image including said filled mask area to a plurality of binary image data with a plurality of threshold values;

generating mask-contour vector data representing a contour of said mask area, and converting said plurality of binary image data to a plurality of density-contour vector data, each said density-contour vector data representing a contour of a binary image represented by each said binary image data;

detecting a plurality of intersections of each density-contour expressed by each of the plurality of density-contour vector data and said mask-contour expressed by the mask-contour vector data and for deleting a portion overlapping said mask-contour from said each density-contour;

connecting the plurality of intersections, which are included in said each density-contour, in pairs to make said each density-contour to be a closed figure, and for generating a plurality of modified contour vector data, each said modified contour vector data representing said each closed density-contour; and converting said plurality of modified contour vector data to modified multi-tone image data.

20. A method for modifying a multi-tone image, said method comprising the steps of:

specifying a mask area as a target area of modification in the multi-tone image;

generating a plurality of binary images by binarization said multi-tone image with a plurality of threshold values;

extracting a plurality of density-contours corresponding to said plurality of binary images;

deleting a portion overlapping with a contour of said mask area from each said density-contour without carrying out image contraction and image expansion; and converting the plurality of density-contours, from which the contour of said mask area has been deleted, to a modified multi-tone image.

21. A method in accordance with claim 20, wherein said step of deleting comprises the step of:

detecting a plurality of intersections of said each density-contour and the contour of said mask area, and connecting said plurality of intersections in pairs when deleting the portion overlapping with the contour of said mask area from each density-contour.

22. A method for modifying a multi-tone image, said method comprising the steps of:

specifying a mask area as a target area of modification in the multi-tone image;

generating a plurality of binary images by binarization of said multi-tone image with a Plurality of threshold values;

extracting a plurality of density-contours corresponding to said plurality of binary images;

deleting a portion included in a contour of said mask area from each said density-contour without carrying out image contraction and image expansion;

converting the plurality of density-contours, from which the contour of said mask area has been deleted, to a modified multi-tone image, wherein said step of deleting comprises the step of:

detecting a plurality of intersections of said each density-contour and the contour of said mask area, and connecting said plurality of intersections in pairs when deleting the portion included in the contour of said mask area from each density-contour.

* * * * *